March 4, 1958  HANS-MARTIN PAPE ET AL  2,825,509
APPARATUS FOR THE OUTFLOW OF CONDENSED WATER
Filed Oct. 29, 1951
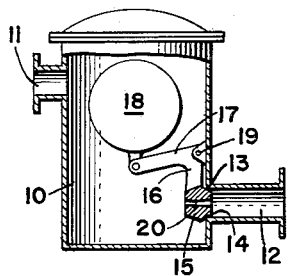
FIG. 1
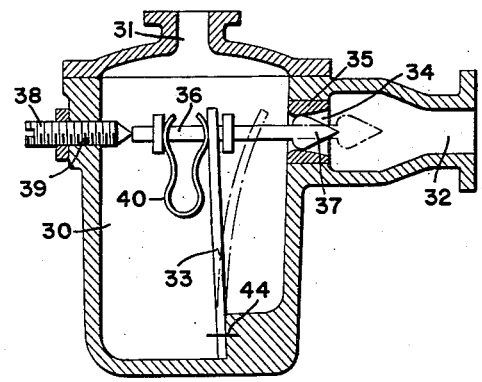
FIG. 2
FIG. 3
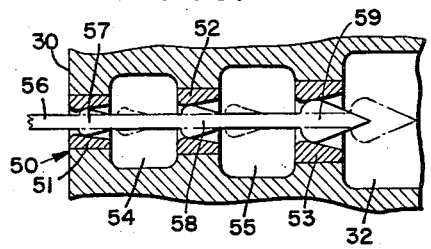
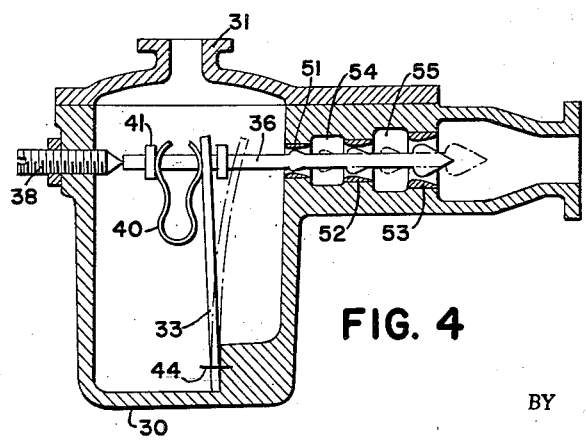
FIG. 4
INVENTOR
HANS-MARTIN PAPE
RUDOLF LETZAS
BY
ATTORNEYS United States Patent Office 2,825,509
Patented Mar. 4, 1958

2,825,509

APPARATUS FOR THE OUTFLOW OF CONDENSED WATER

Hans-Martin Pape and Rudolf Letzas, Bremen, Germany, assignors to Gustav F. Gerdts, Bremen, Germany Application October 29, 1951, Serial No. 253,728

3 Claims. (Cl. 236—59)

This invention relates to an apparatus for the removal of condensation water.

An object of the present invention is the provision of an apparatus of high efficiency and output for the removal of condensation water in steam aggregates.

Another object of the present invention is to simplify the construction of devices of this type and to minimize the danger of possible interference with the operation of such devices.

Other objects of the present invention will become apparent in the course of the following specification.

In accomplishing the object of the present invention it was found desirable to provide an apparatus having a controlling device, such as a float, a thermostat or the like. An outflow member is connected with this controlling device and automatically moved thereby in relation to a further outflow device having a rigid outflow passage of constant cross-sectional areas, the movement being such that the flow of the water out of the two outflow members takes place through the same opening which is located between the casing and the outflow pipe.

The invention will appear more clearly from the following detailed description when taken in conjunction with accompanying drawings showing by way of example preferred embodiments of the inventive idea.

In the drawing:

Figure 1 is a diagrammatic section through an apparatus constructed in accordance with the principles of the present invention.

Figure 2 is a diagrammatic section through a somewhat differently constructed apparatus.

Figure 3 is a section through a differently constructed nozzle.

Figure 4 illustrates a valve combining the nozzle of Figure 3 with the construction shown in Figure 2.

The device shown in Figure 1 of the drawings includes a casing 10, provided with an inflow pipe 11 and an outflow pipe 12. The water flows from the casing 10 into the outflow pipe 12 through a passage 13. The casing part enclosing the passage 13 has the form of a valve seat 14. A valve body 15 is movable in relation to the passage 13. The valve body 15 is carried by an arm 16 of a two-armed lever, the second arm 17 of which is connected to a float 18. The lever 16, 17 is pivoted at 19 to the casing 10.

It is apparent that the float 18 will move up or down in the casing 10 depending upon the level of the water in the casing and that as a result of this movement the valve body 15 will be moved closer to the opening 13 or away from the opening.

It is apparent that the float 18 can be conveniently replaced by any other device which is in general use, for example a thermostat.

In accordance with the present invention the valve body 15 is provided with a passage 20 extending through the valve body substantially in the direction of the outflow pipe 12. The passage 20 thus constitutes a rigid outflow passage of constant cross-sectional areas and has essentially the form of a nozzle.

It is apparent that the single nozzle constituting the passage 20 may be replaced by a series of nozzles, as illustrated, for example, in Figure 3 of the drawings.

The operation of this apparatus is apparent from the above description. When large amounts of water are to flow through the apparatus, the float 18 is located in a position in which the opening 13 is free for the flow of water. On the other hand, when the amount of steam is increased while the amount of water is low, the position of the float 18 is such that the valve body 15 is located within the opening 13 so that the operative area of the opening 13 is reduced to the area of the passage 20.

Figure 2 shows a somewhat different construction which includes a casing 30, an inflow pipe 31 and an outflow pipe 32. In this construction the controlling device is constituted by a thermostat 33 which is attached at 44 to the casing.

In the example illustrated, the thermostat 33 consists of a single bi-metallic strip. Obviously, this single bi-metallic strip may be replaced by a package consisting of a plurality of such strips so as to increase the operation of the thermostat.

Passage 34 for the outflow of the water is located between the casing 30 and the outflow tube 32. The passage 34 is formed by sleeve 35, the walls of which have the form of a nozzle expanding in the direction toward the outflow pipe 32. It is apparent that the smallest operative diameter of the sleeve 35 corresponds to the variable cross-section of the outflow member actuated by the controlling device 33. In the example illustrated the thermostat 33 cooperates with a valve body consisting of an elongated rod 36 and a body 37 carried by one end of the rod 36. Thus the valve body has essentially the form of a so-called nozzle needle. The operative position of the valve body is illustrated in full lines in Figure 2. It is apparent that the diameter of the member 37 is smaller than the smallest inner diameter of the sleeve 35 so that in the operative position an annular space is provided between the member 37 and the sleeve 35. Obviously, this narrow annular, cross-sectional area must correspond to the required cross-section of the outflow member with a rigid outflow passage. The inoperative position of the valve body is illustrated by broken lines in Figure 2. In this position the member 37 is moved away from the sleeve 35 and is located in the outflow tube 32. Thus the entire space enclosed by the sleeve 35 is now available for the free passage of the water. A stop 38 is used to adapt the narrowest operative annular cross-sectional area formed by the member 37 and the sleeve 35 to the amount of water which passes in the course of the normal operation of the apparatus. The stop 38 is threaded into a passage 39 formed in the casing 30. The stop 38 is preferably located opposite the inner end of the rod 36 so that it will engage this end of the rod in the operative position of the valve body.

It is advisable to provide a U-shaped spring 40 between the thermostat 33 and an abutment 41 carried by the valve rod 36. The spring 40 which thus connects the thermostat 33 with the valve rod 36 is of such strength that the stop 38 is engaged by the valve rod 36 only when a boiling temperature at a predetermined operating pressure has been reached.

The operation of this apparatus is as follows:

When the plant is cold or when there are large masses of cold condensed water that flow through the apparatus, the thermostat 33 and the valve body 36, 37, connected therewith are located in the inoperative position shown by the broken lines in Figure 2. Then a large amount of water can flow through the device and through the passage 34 and out through the outflow pipe 32.

After the plant has been heated up and when hot water or steam flow into the casing 30, the thermostat 33 will be heated and will move from the position shown by broken lines in Figure 2 to the position shown by full lines. Then the valve body 36, 37 will also move to the operative position in which the valve stem 36 will be engaged by the stop 38. It is apparent that the stop 38 is so adjusted that in the operative position an annular cross-sectional area is provided between the member 37 and the adjacent inner walls of the sleeve 35. This area is calculated to be such that the amount of condensed water which is available in the normal operation of the plant can conveniently flow from the casing 30 into the outflow tube 32.

With the rise in temperature and the bending of the thermostat 33 caused thereby the valve body 36 will engage the stop 38. This will stop the movement of the valve body 36 in the direction toward the stop 38, so that if the temperature is still further increased, the thermostat 33 will not have been able to move any further, except through the provision of the spring 40 which is located between the thermostat 33 and the valve body 36. The spring 40 will be compressed during the further movement of the thermostat 33. It will be noted that if the spring 40 were not there, so that the stop 38 would prevent a further movement of the thermostat 33, then with an increase in temperature the thermostat 33 would be subjected to excessive strains and maybe break. The purpose of the spring 40 located between the thermostat 33 and the valve body 36, is to prevent these damaging excessive strains upon the thermostat 33.

It is apparent that in this construction as well as in the one shown in Figure 1 the automatically movable parts of the apparatus remain motionless in the course of the normal operation, thereby preventing wear to the apparatus and avoiding premature breakage.

The construction shown in Figure 2 is somewhat more advantageous than that of Figure 1 since the operative area of the nozzle passage 34 can be conveniently adjusted. Furthermore, since the member 37 moves outward to the inoperative position, dirt particles which may collect in the passage 34 will be removed by the flow of the liquid and thus any danger of clogging up the passage is effectively eliminated.

As already stated, the single nozzle illustrated in the constructions of Figures 1 and 2 may be conveniently replaced by a device consisting of a plurality of nozzles which are interconnected in series. The application of the multiple-nozzle device to the construction of Figure 2 is shown in Figure 4 while the multiple nozzle is illustrated in Figure 3. Figure 3 shows a compound nozzle 50 located between the outflow tube 32 and the interior of the casing 30. The compound nozzle 50 in the example illustrated consists of three nozzles 51, 52, and 53. It is apparent that the nozzle 52, following nozzle 51, is larger than nozzle 51 and has a larger average diameter, while the nozzle 53 following nozzle 52 is larger than the nozzle 52 and 51 and has a larger average diameter. Similarly, the smallest diameters of the three nozzles vary, the smallest diameter of nozzle 53 being larger than the smallest diameter of nozzle 52 which in its turn is larger than the smallest diameter of nozzle 51. An annular chamber 54 separates the nozzle 51 from the nozzle 52 while an annular chamber 55 separates the nozzle 53 from the nozzle 52. It is apparent that the cross-sectional area of each chamber adjacent to the nozzle opening into that chamber is greater than the largest cross-section of that nozzle. A valve body consisting of a valve stem or rod 56, and members 57, 58 and 59, cooperates with the nozzles 51, 52, and 53. The members 57, 58, and 59 and the chambers 54 and 55 are so dimensioned that in the inoperative position of the valve body which is shown in broken lines in Figure 3, the members 57, 58 and 59 are located outside of the nozzles and thus do not interfere with the free flow of the water through the passage constituted by the nozzles. In this inoperative position of the valve body, the passages thus formed by the nozzles are not restricted and no throttling effect is exerted upon the flow of the water.

Otherwise this apparatus is similar to the one previously described and operates in the same manner.

It is apparent that the examples set forth above have been given solely by way of exemplification and not by way of limitation and that they are subject to various modifications without departing from the scope and intent of the present invention. All such variations and modifications are to be included within the scope of the present invention.

What is claimed is:

1. An apparatus for the removal of condensation water, comprising a casing, an outflow tube, an outflow passage located between said casing and said outflow tube and comprising a plurality of nozzles, and a separate chamber between any two adjacent nozzles, each nozzle opening into a separate chamber, whereby said nozzles and said chambers are interconnected in series, the cross-sectional area of each chamber adjacent to the nozzle opening into that chamber being greater than the largest cross-section of that nozzle; a valve body axially movable in said passage and comprising an elongated rod and members carried by said rod, the number of said members being equal to that of said nozzles, and a thermostat in said casing operable depending upon the temperature of the fluid in said casing and operably connected with the rod of said valve body, said valve body being movable by said thermostat from an inoperative position in which said members are situated in said chambers to an operative position in which said members are situated in said nozzles.

2. An apparatus for the removal of condensation water, comprising a casing, an outflow tube, an outflow passage located between said casing and said outflow tube and comprising a plurality of nozzles and a separate chamber between any two adjacent nozzles, each nozzle opening into a separate chamber, whereby said nozzles and said chambers are interconnected in series, the cross-sectional area of each chamber adjacent to the nozzle opening into that chamber being greater than the largest cross-section of that nozzle; a valve body axially movable in said passage and comprising an elongated rod and members carried by said rod, the number of said members being equal to that of said nozzles, and a thermostat in said casing operable depending upon the temperature of the fluid in said casing, a spring in said casing, said spring operatively connecting said thermostat with the rod of said valve body, said valve body being movable by said thermostat from an inoperative position in which said members are situated in said chambers to an operative position in which said members are situated in said nozzles, and a stop adjustably mounted in said casing and adapted to engage an end of said rod to limit the movement of said valve body from said inoperative position to said operative position, said spring being compressible after the movement of said valve body to said operative position.

3. An apparatus for the removal of condensation water, comprising a casing, an outflow tube, means forming an outflow passage between the casing and the tube and comprising a plurality of nozzles interconnected in series and a separate chamber between any two adjacent nozzles, a thermostat in said casing operable depending upon fluid conditions in said casing, a valve body having a valve stem and members carried by said stem and situated in said chambers in the inoperative position of the valve body, a spring connecting said stem with said thermostat, said valve body being movable by said thermostat from said inoperative position to an operative position wherein said members are situated within said nozzles, said spring being compressed after movement of said valve body to its operative position.

References Cited in the file of this patent

UNITED STATES PATENTS

| | | |
|---|---|---|
| 1,384,715 | Willemstyn | July 12, 1921 |
| 1,711,660 | Stephenson | May 7, 1929 |
| 2,264,261 | Erbguth | Nov. 21, 1941 |
| 2,421,144 | Donnelly | May 27, 1947 |

FOREIGN PATENTS

| | | |
|---|---|---|
| 16,849 | Germany | Feb. 11, 1882 |
| 64,018 | Sweden | May 4, 1925 |
| 419,571 | Germany | Oct. 5, 1925 |
| 628,899 | France | July 11, 1927 |
| 676,333 | France | Nov. 28, 1929 |